2,695,278

SOLUTIONS OF ACRYLONITRILE POLYMERS CONTAINING AN INORGANIC ACID

John L. Justice, Chester, Pa., assignor, by mesne assignments, to The Chemstrand Corporation, Decatur, Ala., a corporation of Delaware No Drawing. Application September 7, 1950, Serial No. 183,681

15 Claims. (Cl. 260—30.2)

This invention relates to improved solutions of a fiber-forming polymeric material comprising an acrylonitrile polymer.

The solutions normally obtained by intimately mixing at least 5 percent of an acrylonitrile polymer containing at least 80 percent of acrylonitrile by weight in the molecule, or of a blend comprising such an acrylonitrile polymer, in the known organic solvents for the polymers, are characterized by undesirably high viscosity and are less fluid and mobile than is required for spinning the solutions into fibers at high spinning speeds. For example, in spinning the solutions normally obtained by mixing the acrylonitrile polymer or blend with an organic solvent therefor, by a continuous wet-spinning process in which the solution is extruded into the bath, the fibers are withdrawn over a godet, forwarded directly to a washing drum or the like, thence over a drying device and through a heat-stretching tube to a second godet, and finally to a collecting means, the speed at which the fibers can be withdrawn from the bath and passed over the rotating godets and drums is limited by the high viscosity of the solutions.

The objectionably high viscosity of the solution is particularly noticeable and troublesome in the case of those solutions obtained by intimately mixing 5 percent or more of a blend comprising a fiber-forming acrylonitrile polymer containing at least 80 percent of acrylonitrile with an organic solvent such as N,N-dimethylformamide, N,N-dimethylacetamide, sulfolane, nitromethane, etc. For example, the viscosity of a solution of a substantially homogeneous copolymer of 98 percent acrylonitrile and 2 percent vinyl acetate in dimethylacetamide is too high for rapid spinning, but it is lower than the viscosity of a solution of a blend of such a copolymer of 98 percent acrylonitrile and 2 percent vinyl acetate with a substantially homogeneous copolymer of from 30 to 90 percent of a vinyl-substituted heterocyclic tertiary amine and from 10 to 70 percent of acrylonitrile, the total polymer concentration of the solutions being equal.

The principal object of this invention is to provide organic solvent solutions of the acrylonitrile polymers which are characterized by relatively low viscosity and increased fluidity or mobility as compared to the viscosity and mobility of the solutions normally obtained by intimately mixing a fiber-forming acrylonitrile polymer containing at least 80 percent of acrylonitrile with an organic solvent therefor. Another object is to provide solutions of the polymers which can be spun into fibers at high spinning speeds.

These and other objects are achieved, in accordance with the invention, by intimately mixing the acrylonitrile polymer or polymer blend with the selected organic solvent and a minor proportion of an inorganic acid selected from the group consisting of nitric acid, hydrochloric acid, and sulfamic acid.

The inorganic acids mentioned function to appreciably lower the viscosity and increase the fluidity of the polymer solutions, which in turn permits the steps of washing, drying, and heat-stretching the fibers to be performed continuously at high speed. The modification of the viscosity of the solutions appears to be a purely physical (colloid) phenomenon and is obtained regardless of the organic solvent used, and independently of any modification of the color of the solution, and whether the solvent is one which liberates an amine on heating or not.

The inorganic acid may be used to lower the viscosity of solutions of the polymers in dimethylformamide or dimethylacetamide, but the invention is not limited thereto. The inorganic acids mentioned may be used to lower the viscosity and improve the fluidity of a solution of the polymer or polymer blend in any solvent which dissolves the polymer or blend to produce solutions of from 5 to 30 percent concentration, and which is also a solvent for the inorganic acid. Examples of suitable solvents are dimethylformamide, dimethylacetamide, sulfolane, and nitromethane.

The amount of the inorganic acid used to modify the solution viscosity may vary. Preferably, the acid is used in an amount of from 0.1 to 5 percent based on the weight of the organic solvent.

In a preferred embodiment of the invention, the solutions are prepared by dissolving the inorganic acid in the organic solvent, and then dispersing the polymeric material in finely divided condition in the solution, at room temperature, with rapid stirring, followed by heating to complete the dissolution of the polymer.

The polymeric material may be an acrylonitrile polymer containing at least 80 percent of acrylonitrile in the molecule, including copolymers containing in addition to the acrylonitrile, up to 20 percent of another >C=C<-containing substance which is copolymerizable with acrylonitrile. For example, in addition to polyacrylonitrile, the polymer may be a copolymer of acrylonitrile with one or more of the following substances: acids such as acrylic, haloacrylic, and methacrylic acids; esters such as methyl methacrylate, butyl, octyl, methoxymethyl, and chlorethyl methacrylates and the corresponding esters of acrylic and α-chloracrylic acids; methacrylonitrile; vinyl and vinylidene halides such as vinyl chloride, vinyl fluoride, vinylidene chloride, vinylidene fluoride, 1-fluoro-1-chlorethylene; vinyl carboxylates such as vinyl acetate, vinyl chloracetate, vinyl propionate, and vinyl stearate; N-vinylimides such as N-vinylphthalimide and N-vinyl succinimides; N-vinylcaprolactam and N-vinylbutyrolactam, vinyl aryl compounds such as styrene and vinyl naphthalene; vinyl-substituted tertiary heterocyclic amines, such as the various isomeric vinylpyridines, e. g., 2-vinyl-pyridine, the various isomeric vinyl pyrazines; allyl and vinyl amides in which the nitrogen atom is directly attached to the allyl or vinyl radical, such as N-allyl-formamide, N-methallylformamide, N-ethallylformamide, allyl urea, N-allyl sulfonamides, N-vinyl-N-methylformamide, etc. Or the polymeric material may be a blend of a base polymer containing in the molecule at least 80 percent by weight of acrylonitrile with from 2 to not more than 50 percent on the weight of the blend of a modifying polymeric material. Various polymeric materials may be blended with the base polymer to modify it in various respects. Suitable modifying polymeric materials are those which are soluble in dimethylacetamide and which, when mixed with the base polymer in an amount of from 2 to 50 percent of the blend, result in a blend which forms a solution of at least 5 percent concentration in dimethylacetamide, which solution can be formed into fibers by conventional processes. For example, a base acrylonitrile polymer which is not dye-receptive, such as a copolymer of 95 to 99 percent acrylonitrile and 1 to 5 percent of vinyl acetate may be blended with a dye-receptive polymer, such as a copolymer of from 30 to 90 percent of a vinyl-substituted heterocyclic tertiary amine and from 10 to 70 percent of acrylonitrile, to produce a dye-receptive blend. These blends can be mixed with an organic solvent, such as dimethylacetamide, and the resulting mixture can be spun into filaments. However, the viscosity of a solution of a blend of two acrylonitrile polymers is higher than is indicated by the viscosities of solutions of the individual polymers and the mixture or solution comprising the blend is so viscous that it cannot be spun into filaments at high spinning speeds. In accordance with this invention, the viscosity of the mixture of dimethylacetamide and polymer blend is markedly lowered by the inclusion of a selected inorganic acid as disclosed herein. The final composition comprising the polymer or blend, the solvent, and the inorganic acid is a highly fluid, clear, mobile solution which unlike the composition obtained without the use of the inorganic acid does not contain suspended, undissolved gel particles.

The solutions are stable with respect to their viscosity and show no tendency to increase in viscosity on standing for long periods of time.

Further details of the practice of the invention are set forth in the following examples, in which parts are by weight.

The viscosity values given in the examples were measured at 50° C. by the falling ball method using stainless steel balls one-quarter inch in diameter. The viscosity was calculated from the time of fall, using Bacon's modification of the Faxen equation (Bacon, J. Franklin Inst. 221, 251, 1936).

*Example I*

Hydrochloric acid was intimately mixed with dimethylacetamide, and a sufficient amount of a copolymer of 97 percent acrylonitrile and 3 percent vinyl acetate, and of a copolymer of 50 percent 2-vinylpyridine and 50 percent acrylonitrile were blended in the mixture to obtain an 18 percent solution of the blended polymers containing 0.2 cc. of hydrochloric acid per each 300 gms. of the solution. The overall 2-vinylpyridine content of the blend was 5 percent. The mixture was stirred at 80° C., and maintained at that temperature until the blended polymers were completely dissolved. The resulting clear solution had a viscosity of 90 poises at 50° C. This compared to a viscosity of 117 for a control solution of the blend, which did not contain the hydrochloric acid.

*Example II*

A solution was prepared as in Example I by blending the copolymers of Example I in the same relative proportions in dimethylacetamide containing an amount of nitric acid such that the final solution contained 0.2 cc. of nitric acid per 300 gms. of the solution. The final solution had a viscosity of 109 poises at 50° C.

*Example III*

A solution was prepared as in Example I by blending the acrylonitrile-vinyl acetate copolymer and the 2-vinylpyridineacrylonitrile copolymer in the same relative proportions, in dimethylacetamide containing an amount of sulfamic acid such that the final solution contained 0.5 gm. of sulfamic acid per each 300 gms. of solution. The final solution had a viscosity of 93 poises at 50° C.

In addition to forming fibers from the compositions of the invention, they can be formed into other shaped articles such as films, sheets, casings, tubings, rods, etc.

The invention is defined by the appended claims.

I claim:

1. A new composition of matter adapted to be formed into shaped articles, comprising at least 5 percent of an acrylonitrile polymer containing, by weight in the polymer molecule, at least 80 percent of acrylonitrile, an organic solvent for the polymer, and from 0.1 to 5.0 percent based on the weight of the organic solvent of an inorganic acid selected from the group consisting of nitric acid, hydrochloric acid, and sulfamic acid.

2. A composition as in claim 1, wherein the polymer is an acrylonitrile copolymer containing, by weight in the molecule, at least 80 percent of acrylonitrile and at least 1 percent of another >C=C<-containing substance which is copolymerizable with acrylonitrile.

3. A composition as in claim 1, wherein the polymer comprises a blend of a base polymer containing, by weight in the molecule, at least 80 percent of acrylonitrile with from 2 to 50 percent on the weight of the blend of a copolymer containing from 30 to 90 percent of a vinyl-substituted tertiary heterocyclic amine and from 10 to 70 percent of acrylonitrile.

4. A composition as in claim 1, wherein the polymer comprises a blend of a base copolymer containing, by weight in the molecule, from 95 to 99 percent of acrylonitrile and from 1 to 5 percent of vinyl acetate, with from 2 to 50 percent on the weight of the blend of a copolymer containing from 30 to 90 percent of 2-vinylpyridine and from 10 to 70 percent of acrylonitrile.

5. A composition as in claim 1, wherein the inorganic acid is nitric acid.

6. A composition as in claim 1, wherein the inorganic acid in hydrochloric acid.

7. A composition as in claim 1, wherein the inorganic acid is sulfamic acid.

8. A composition as in claim 1, wherein the organic solvent for the polymer is dimethylacetamide.

9. A composition as in claim 1, wherein the organic solvent for the polymer is dimethylformamide.

10. A composition as in claim 1, wherein the organic solvent for the polymer is sulfolane.

11. As a new composition of matter adapted to be formed into shaped articles, at least 5 percent of a blend of a base polymer containing, by weight in the molecule, from 95 to 99 percent of acrylonitrile with from 2 to 50 percent on the weight of the blend of a copolymer containing, by weight in the molecule, from 30 to 90 percent of a vinylpyridine and from 10 to 70 percent of acrylonitrile, dimethylacetamide, and from 0.1 to 5 percent on the weight of the dimethylacetamide, of hydrochloric acid.

12. As a new composition of matter adapted to be formed into shaped articles, at least 5 percent of a blend of a base polymer containing, by weight in the molecule, from 95 to 99 percent of acrylonitrile and from 2 to 50 percent on the weight of the blend of a copolymer containing, by weight in the molecule, from 30 to 90 percent of a vinylpyridine and from 10 to 70 percent of acrylonitrile, dimethylacetamide and from 0.1 to 5 percent on the weight of the dimethylacetamide, of nitric acid.

13. As a new composition of matter adapted to be formed into shaped articles, at least 5 percent of a blend of a base polymer containing, by weight in the molecule, from 95 to 99 percent of acrylonitrile and from 2 to 50 percent on the weight of the blend of a copolymer containing, by weight in the molecule, from 30 to 90 percent of a vinylpyridine and from 10 to 70 percent of acrylonitrile, dimethylacetamide and from 0.1 to 5 percent on the weight of the dimethylacetamide of sulfamic acid.

14. As a new composition of matter adapted to be formed into shaped articles, at least 5 percent of a blend of a base polymer containing, by weight in the molecule, from 95 to 99 percent of acrylonitrile and from 1 to 5 percent of vinyl acetate, with from 2 to 50 percent of a copolymer containing, by weight in the molecule, about 50 percent of acrylonitrile and about 50 percent of 2-vinylpyridine, dimethylacetamide, and from 0.1 to 5.0 percent on the weight of the dimethylacetamide of hydrochloric acid.

15. A composition as in claim 1, wherein the polymer is polyacrylonitrile.

References Cited in the file of this patent

UNITED STATES PATENTS

| Number | Name | Date |
|---|---|---|
| 2,404,728 | Finzel | July 23, 1946 |
| 2,579,451 | Polson | Dec. 18, 1951 |